US012271782B2

(12) United States Patent
Perlin et al.

(10) Patent No.: US 12,271,782 B2
(45) Date of Patent: Apr. 8, 2025

(54) SENSE-PLUS-COMPUTE QUANTUM-STATE CARRIERS

(71) Applicant: ColdQuanta, Inc., Boulder, CO (US)

(72) Inventors: Michael A. Perlin, Chicago, IL (US); Pranav Gokhale, Chicago, IL (US); Frederic T. Chong, Chicago, IL (US); Mark Saffman, Madison, WI (US); Dana Zachary Anderson, Boulder, CO (US)

(73) Assignee: ColdQuanta, Inc., Boulder, CO (US)

( * ) Notice: Subject to any disclaimer, the term of this patent is extended or adjusted under 35 U.S.C. 154(b) by 69 days.

(21) Appl. No.: 18/205,434

(22) Filed: Jun. 2, 2023

(65) Prior Publication Data

US 2024/0370753 A1 Nov. 7, 2024

Related U.S. Application Data

(60) Provisional application No. 63/354,486, filed on Jun. 22, 2022, provisional application No. 63/349,113, filed on Jun. 5, 2022.

(51) Int. Cl.
*G06N 10/20* (2022.01)
*G06N 10/70* (2022.01)

(52) U.S. Cl.
CPC .............. *G06N 10/20* (2022.01); *G06N 10/70* (2022.01)

(58) Field of Classification Search
CPC .................................. G06N 10/20; G06N 10/70
See application file for complete search history.

(56) References Cited

U.S. PATENT DOCUMENTS

| 10,979,147 | B2 | 4/2021 | Gordon |
| 11,002,777 | B2 | 5/2021 | Salim |
| 11,165,505 | B2 | 11/2021 | Gordon |
| 2011/0234219 | A1 | 9/2011 | Boehi |

(Continued)

FOREIGN PATENT DOCUMENTS

WO 2021077041 4/2021

OTHER PUBLICATIONS

Degen et al. "Quantum Sensing". Review of Modern Physics, 2017, pp. 39.*

(Continued)

*Primary Examiner* — Li Wu Chang
(74) *Attorney, Agent, or Firm* — Michael J. Attisha; Samuel Means; Greenberg Traurig, LLP

(57) ABSTRACT

Sense+compute (S+C) quantum-state carriers (QSCs), e.g., rubidium atoms, can be used provide more scalable quantum sensor systems. Multiple S+C QSCs can capture sensor data. The sensor data can then be transformed in the quantum domain according to a quantum tomographic protocol. The transformed data can be measured to provide a respective classical domain measurement. The sensing, transformation, and measurement can be repeated to provide a set of measurements (corresponding to different transformations) that can be combined according to the quantum tomography protocol to generate a model of the original quantum state. Estimation error associated with the model can be scaled down at a rate corresponding more closely to increases in the number N of QSCs than $\sqrt{N}$, even in the presence of noise.

27 Claims, 6 Drawing Sheets

(56) References Cited

U.S. PATENT DOCUMENTS

| | | | |
|---|---|---|---|
| 2015/0055961 | A1* | 2/2015 | Meyers .................. G06N 10/00 398/140 |
| 2016/0363617 | A1 | 12/2016 | Anderson |
| 2019/0187198 | A1 | 6/2019 | Anderson |
| 2020/0233025 | A1 | 7/2020 | Salim |
| 2020/0292606 | A1 | 9/2020 | Holloway |
| 2020/0295838 | A1 | 9/2020 | Gordon |
| 2021/0048465 | A1 | 2/2021 | Anderson |
| 2021/0159987 | A1 | 5/2021 | Zhang |
| 2021/0255228 | A1 | 8/2021 | Evan |
| 2021/0270882 | A1 | 9/2021 | Imhof |
| 2022/0003829 | A1 | 1/2022 | Anderson |
| 2022/0196716 | A1 | 6/2022 | Anderson |
| 2022/0291268 | A1 | 9/2022 | Anderson |
| 2023/0137266 | A1 | 5/2023 | Mcbride |

OTHER PUBLICATIONS

Yang et al. "Hybrid quantum-classical approach to enhanced quantum metrology", arXiv:2008.06466v2 [quant-ph] Jan. 20, 2021, pp. 10.*
Huang et al., Quantum Advantage in Learning from Experiments, Research Article, Quantum Computing, Science 376, 1182-1186 (2022) Jun. 10, 2022.
Ma et al., Quantum Spin Squeezing, Mar. 28, 2011.
Anderson et al., Rydberg atoms for radio-frequency communications and sensing: atomic receivers for pulsed RF field and phase detection, Rydberg Technologies Inc., Ann Arbor, MI 48103 USA; Oct. 18, 2019, 10 pages.
Berweger et al., Rydberg state engineering: A comparison of tuning schemes for continuous frequency sensing, Sep. 28, 2022; 11 pages.
Berweger et al., Rydberg-State Engineering: Investigations of Tuning Schemes for Continuous Frequency Sensing, Physical Review Applied 19, 044049, 13 pages, Apr. 18, 2023.
Bohaichuk et al., The Origins of Rydberg Atom Electrometer Transient Response and its Impact on Radio Frequency Pulse Sensing, Quantum Valley Ideas Laboratories, Sep. 13, 2022, 20 pages.
Cai et al., Sensitivity improvement of Rydberg atom-based microwave sensing via electromagnetically induced transparency, Nov. 15, 2021, 8 pages.
Carr et al., Three-photon electromagnetically induced transparency using Rydberg states, Optics Letters / vol. 37, No. 18, Sep. 15, 2012, 3 pages.
Carter et al., Electric field sensing near the surface microstructure of an atom chip using cold Rydberg atoms, Department of Physics and Astronomy and Institute for Quantum Computing, University of Waterloo, Dec. 21, 2013, 7 pages.
Daschner et al., Triple stack glass-to-glass anodic bonding for optogalvanic spectroscopy cells with electrical feedthroughs, Physikalisches Institut, Mar. 5, 2014, 4 pages.
David Henry Meyer, Magnetic & Electric Field Sensing And Applications Based on Coherent Effects in Neutral Atoms, 2018, 265 pages.
Fan et al., Atom Based RF Electric Field Sensing, Journal of Physics B: Atomic, Molecular and Optical Physics, Topical Review, published Sep. 9, 2015, pp. 1-16.
Fan et al., Sub-wavelength microwave electric field imaging using Rydberg atoms inside atomic vapor cells, Homer L. Dodge Department of Physics and Astronomy, The University of Oklahoma, Mar. 14, 2014, 5 pages.
Grabowski et al., High Resolution Rydberg Spectroscopy of ultracold Rubidium Atoms, Aug. 25, 2016, 9 pages.
Holloway et al., Broadband Rydberg Atom Based Self-Calibrating RF E-Field Probe, National Institute of Standards and Technology (NIST), Electromagnetics Division, 3 pages.
Holloway et al., Broadband Rydberg Atom-Based Electric-Field Probe: From Self-Calibrated Measurements to Sub-Wavelength Imaging, National Institute of Standards and Technology (NIST), U.S. Department of Commerce, Boulder Laboratories, May 27, 2014, 12 pages.
Holloway et al., Electric field metrology for SI traceability: Systematic measurement uncertainties in electromagnetically induced transparency in atomic vapor, Journal of Applied Physics 121, 233106; doi: 10.1063/1.4984201, 2017, 10 pages.
Holloway et al., Electromagnetically induced transparency based Rydberg-atom sensor for quantum voltage measurements, Oct. 26, 2021, 13 pages.
Hu et al., Continuously tunable radio frequency electrometry with Rydberg atoms, Appl. Phys. Lett. 121, 014002; https://doi.org/10.1063/5.0086357, Jul. 7, 2022, 7 pages.
Kilian Talo Theodor Singer, Interactions in an ultracold gas of Rydberg atoms, Oct. 2004, 133 pages.
Mao et al., A high-efficiency fiber-coupled Rydberg-atom integrated probe and its imaging applications, IEEE Antennas and Wireless Propagation Letters, 2022, 5 pages.
Meyer et al., Optimal Atomic Quantum Sensing using EIT Readout, Aug. 9, 2021, 12 pages.
Otto et al., Data capacity scaling of a distributed Rydberg atomic receiver array, Department of Physics, QSO-Centre for Quantum Science, and Dodd-Walls Centre, University of Otago, Dunedin, New Zealand, Apr. 8, 2021, 10 pages.
Prajapati et al., Enhancement of electromagnetically induced transparency based Rydberg-atom electrometry through population repumping, Aug. 31, 2021, 5 pages.
Prajapati et al., TV and Video Game Streaming with a Quantum Receiver: A Study on a Rydberg atom-based receiver's bandwidth and reception clarity, National Institute of Standards and Technology, May 13, 2022, 6 pages.
Renate Daschner, Addressable Rubidium vapor cells for optical and electrical read-out of Rydberg excitations, 2015, 195 pages.
Ripka et al., Rydberg atom-based radio frequency: hyperfine effects, Proc. SPIE 12016, Optical and Quantum Sensing and Precision Metrology II, 120160I, Mar. 2, 2022, 7 pages.
Simons et al., Continuous radio frequency electric-field detection through adjacent Rydberg resonance tuning, Oct. 9, 2021, 9 pages.
Simons et al., Using frequency detuning to improve the sensitivity of electric field measurements via electromagnetically induced transparency and Autler-Townes splitting in Rydberg atoms, Applied Physics Letters 108, 174101; doi: 10.1063/1.4947231, 2016, 6 pages.
Teale et al., Degenerate two-photon Rydberg atom voltage reference, AVS Quantum Sci. 4, 024403; https://doi.org/10.1116/5.0090892, Jun. 15, 2022, 6 pages.
Thaicharoen et al., Electromagnetically-induced transparency, absorption, and microwave field sensing in a Rb vapor cell with a three-color all-infrared laser system, May 27, 2019, 9 pages.
Van Ditzhuijzen et al., Simultaneous position and state measurement of Rydberg atoms, Eur. Phys. J. D 40, 13-17. DOI: 10.1140/epjd/e2006-00140-1, Jun. 21, 2006, 6 pages.
You et al., Microwave-field sensing via electromagnetically induced absorption of Rb irradiated by three-color infrared lasers, vol. 30, No. 10, Optics Express, May 9, 2022, 11 pages.
Arampatzis, Protecting the US Power Grid Against Foreign Threats, ITEGRITI Critical Infrastruture Protection, Sep. 6, 2022, 7 pages, https://itegriti.com/2022/compliance/protecting-the-us-power-grid-against-foreign-threats/.
Gao et al., Solving DC Power Flow Problems Using Quantum and Hybrid Algorithms, Applied Soft Computing, vol. 137, Issue 110147, Jan. 13, 2022, 17 pages.
Giovannetti et al., Quantum enhanced positioning and clock synchronization, Nature 412, Issue 6845, Jul. 26, 2001, pp. 417-419.
Jau et al., Vapor-Cell-Based Atomic Electrometry for Detection Frequencies below 1 kHz, Physical Review Applied 13, 2020, pp. 054034-1-054034-11.
Jing et al., Atomic Superheterodyne Receiver Based on Microwave-Dressed Rydberg Spectroscopy, Nature Physics, vol. 16, Sep. 2020, pp. 911-915.
Ma et al., Measurement of DC and AC Electric Fields Inside an Atomic Vapor Cell with Wall-Integrated Electrodes, Jun. 3, 2021, pp. 1-9.

(56) References Cited

OTHER PUBLICATIONS

Matsukevich et al., Quantum State Transfer Between Matter and Light, Science 306, Issue 5696, Oct. 22, 2004, pp. 663-666.
Moffat, Droop Control, Introduction to Electric Power Systems Lecture 12, Dec. 11, 2021, 5 pages.
National Science Foundation, How to Teleport Quantum Information from One Atom to Another, Research News, Feb. 25, 2009, 6 pages, https://new.nsf.gov/news/how-teleport-quantum-information-one-atom-another.
Saleem, Droop Control Mechanism in Power Generators, Apr. 20, 2023, 4 pages, https://energycentral.com/c/iu/droop-control-mechanism-power-generators-%F0%9F%A4%96.
Spizzirri, Quantum network between two national labs achieves record synch, Argonne National Laboratory, Jun. 27, 2022, 5 pages.
Takeda et al., Entanglement Swapping between Discrete and Continuous Variables, Phys. Rev. Lett., vol. 114, Issue 10, Mar. 9, 2015, 9 pages.
Virginia Tech, A Droop Controller is intrinsically a Phase-Locked Loop, 2013, 3 pages.
Voltage Disturbance, Calculating Phase Difference Between Two Waves, Jun. 22 2018, 2 pages, https://voltage-disturbance.com/power-quality/calculating-phase-difference-between-two-waves/.
Wikipedia, North American power transmission grid, Nov. 13, 2023, 6 pages, https://en.wikipedia.Org/w/index.php?title=North_American_power_transmission_grid&oldid=1192141374.
Xairos, Quantum Time Transfer, WSTS Presentation, Mar. 1, 2023, 33 pages.
Zyga, High-fidelity photon-to-atom quantum state transfer could form backbone of quantum networks, PHYS Org, Nov. 28, 2014, 5 pages, https://phys.org/news/2014-II-high-fidelity-photon-to-atom-quantum-state-backbone.html.
Elben et al., The Randomized Measurement Toolbox, pp. 1-20, Mar. 21, 2022.
Huang et al., Predicting Many Properties of a Quantum System from Very Few Measurements, pp. 1-40, Apr. 23, 2020.
Scott Aaronson, Shadow Shadow Tomography of Quantum States, pp. 1-29, Nov. 13, 2018.
Stricker et al., Experimental Single-Setting Quantum State Tomography, pp. 1-34, May 31, 2022.

* cited by examiner

SENSE-PLUS-COMPUTE QUANTUM-STATE CARRIERS

CROSS REFERENCE TO OTHER APPLICATIONS

This application claims priority to U.S. Provisional Patent Application No. 63/349,113 entitled QUANTUM UNIFIED COMPUTATION AND METROLOGY filed Jun. 5, 2022 and U.S. Provisional Patent Application No. 63/354,486 entitled QUANTUM UNIFIED COMPUTATION AND METROLOGY filed Jun. 22, 2022, both of which are incorporated herein by reference for all purposes.

BACKGROUND

As quantum technologies move beyond laboratories, they are providing orders of magnitude performance improvements over classical technologies over a wide spectrum of practical applications. Standard time is now maintained by atomic clocks, which rely on quantum technologies to limit deviations to less than a second over a billion years. Atomic clocks with even greater precision are in development. Quantum technologies are also advancing other metrological applications including navigation (e.g., with quantum accelerometers) and radio frequency (RF) signal detection and direction finding.

Quantum entanglement can be used to achieve a quadratic improvement of the signal-to-noise ratio over metrology with unentangled sensors. Whereas N unentangled sensors can be used to estimate a parameter to within a precision of $\delta\theta=1/\sqrt{N}$, thereby saturating the so-called standard quantum limit, quantum mechanics allows for entangled states that achieve the Heisenberg limit of $\delta\theta=1/N$. Thus, for example, to improve metrological precision by one order of magnitude (×10), the number of sensors can be increased by one order of magnitude (×10) rather than the two orders of magnitude (×100) required for unentangled sensors. However, this theoretical advantage assumes error-free hardware, and in practice, noisy systems fall short of the ideal case for a quantum metrological enhancement. Indeed, the buildup of noise (as the number N of sensors increases) diminishes— and sometimes eliminates altogether—the theoretical enhancement achievable by scaling up a quantum system. So what is needed is a better and more scalable way to preserve quantum information in the context of a noisy environment.

BRIEF DESCRIPTION OF THE DRAWINGS

Various embodiments of the invention are disclosed in the following detailed description and the accompanying drawings.

DETAILED DESCRIPTION

Figure 1:
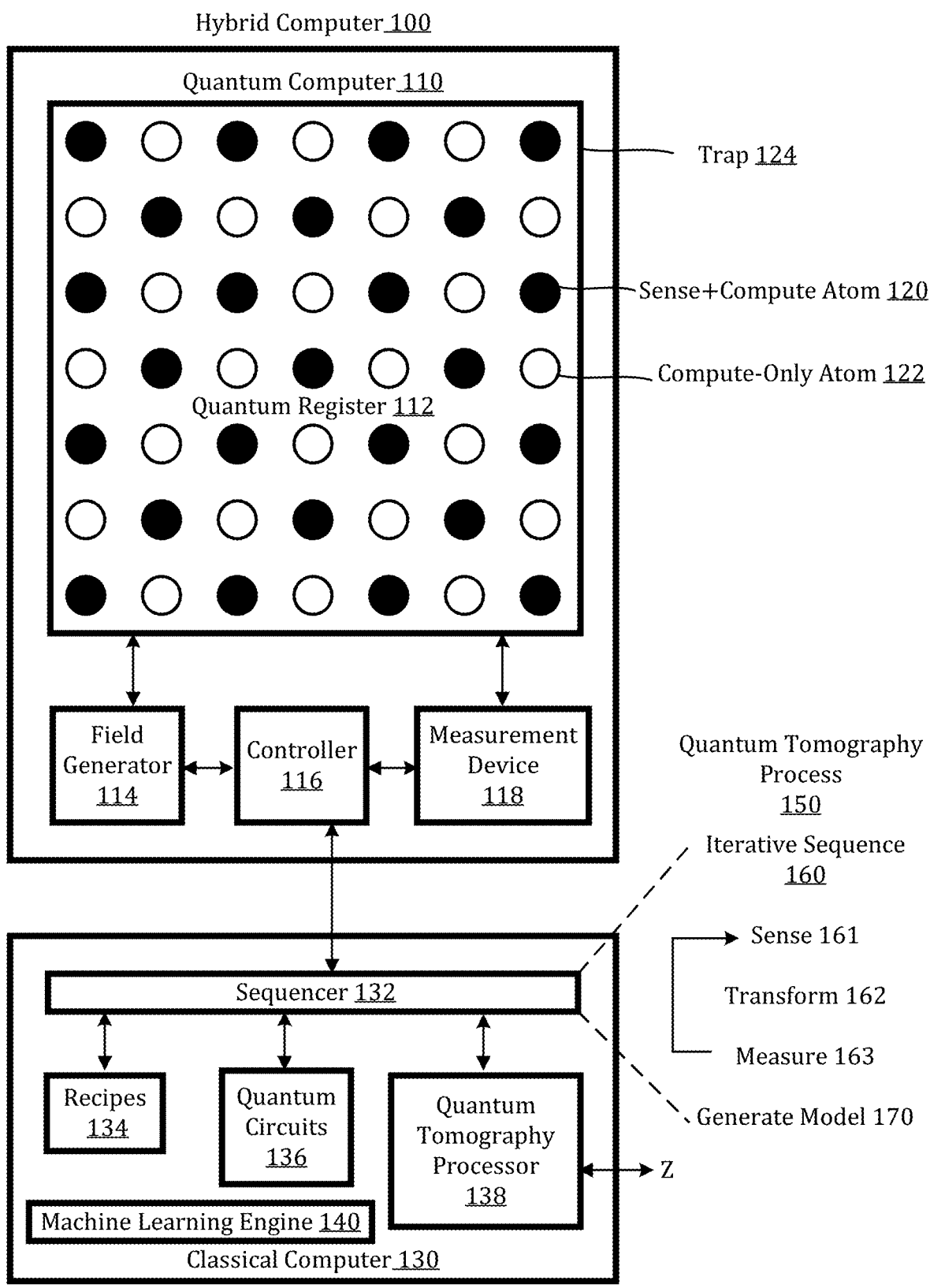
FIG. 1 is a schematic view of a hybrid computing system that includes a classical computer and a quantum computer.

The present invention provides a system including and a process using a multitude of sense-plus-compute quantum-state carriers. Herein, a quantum-state carrier (QSC) is an entity that, within the context of a given system, can transition between quantum states. A sense-plus-compute (S+C) QSC is a QSC that is used to capture and store sense data and also participates in gate-mode computer operations to implement transformations of the sense data. The sense data, for example, can be result from sensing time duration, acceleration, electrical fields, magnetic fields, and electromagnetic (e.g., radio frequency or optical) fields.

Surprisingly, S+C QSCs can be employed to provide solutions to the "need" identified in the Background section above, that is, classes of systems and processes that can yield models with estimation errors that decrease faster than the $1/\sqrt{N}$ classical limit and, in some cases, scale more like $1/N$ than like $1/\sqrt{N}$ even in the presence of noise. Once they capture sensor data, an entangled multitude of S+C QSCs can participate in quantum computer, e.g., quantum gate, operations to implement information-preserving quantum domain transformations of the sense data, e.g., as called for by quantum tomography protocols. Multiple measurements can be taken respectively of instances of transformed sensor data. The multiple measurements can be combined in the classical domain according to quantum tomography protocols. Accordingly, the present invention provides for novel and advantageous implementations of Quantum Unified Computation and Metrology (QUCAM).

Some quantum tomography protocols seek to fully reconstruct a probability density matrix for the original quantum state; for these protocols, the number N of copies of the original quantum state scales exponentially with N, severely limiting QSC counts, e.g., to about 10 QSCs. Other "efficient" quantum tomographic protocols take advantage of constraints imposed by entanglement and use fewer measurements. In a "shadow tomography" protocol, the number M of measurements required does not depend directly on the number N of QSCs but on the number of parameters P to be estimated, greatly extending the number N of QSCs in the quantum system to be characterized. (Shadow tomography is introduced in S. Aaronson, "Shadow Tomography of Quantum States", SIAM Journal on Computing 49, STOC18-368 (2020), and extended in H.-Y. Huang, R. Kueng, and J. Preskill, "Predicting many properties of a quantum system from very few measurements", Nature Physics 16, 1050-1057 (2020).)

Shadow tomography works well, even in the presence of noise, in contexts in which sensor data can be replicated across sense events. These contexts include quantum simulations and scenarios in which a phenomenon being sensed does not vary substantially over the duration iterations of the sensing. For contexts in which sensor data varies substantially from iteration to iteration, the tomographic model can provide statistical descriptions, e.g., distributions and correlations of QSC sensor data, with estimation errors that scale favorably even in the presence of noise. With or without quantum tomography, the S+C QSCs can be used to check conditions in and around a quantum register. In general, continual advances in the state of the art of quantum sensors are made more feasible by the present invention.

For example, a hybrid classical+quantum computer system 100, shown in FIG. 1, includes a quantum computer 110 and a classical computer 130. Quantum computer 110 includes a quantum register 112, a field generator 114, a controller 116, and a measurement device 118. Quantum register 112 includes dual-purpose S+C atoms 120 and CO atoms 122 held in an array by a trap 124, e.g., an optical lattice and/or an array of optical tweezers. Classical computer 130 includes a sequencer 132, recipes 134, quantum circuits 136, a quantum tomography processor 138, and a machine-learning engine 140. Sequencer 132 implements a quantum tomography process 150 including an iterative sequence 160 and model generation at 170. Iterative sequence 160 includes sensing to capture original sensor data at 161, transforming the original sensor data to yield transformed sensor data at 162, and measuring the transformed sensor data at 163. The model generated at 170 is based on the plural measurements taken during the iterations of measuring at 163.

Quantum register 112 includes S+C atoms and CO atoms arranged in a "checker-board" pattern in a 7×7 square array. The total of 49 atoms includes 25 S+C atoms and 24 CO atoms. The rows and columns of the array are characterized by a 2 micron (μm) pitch. The S+C and the CO atoms are rubidium 87 ($^{87}$Ru) atoms. In other embodiments, other QSC types are used, e.g., other isotopes of rubidium, other alkaline earth metal atoms, alkaline earth metal atoms, atoms of other elements, polyatomic molecules, ions, other molecular entities, superconducting circuits, nitrogen vacancies in diamond. The S+C QSCs can be of a different QSC type than the CO QSCs, e.g., rubidium 85 ($^{85}$Rb) or cesium 133 ($^{133}$Cs) instead of $^{87}$Rb. The QSCs can be arranged in one, two, or three spatial dimensions; the numbers of S_C atoms can range from 10 up, while the number of CO atoms can range from zero up. The pitch of the QSCs can vary as well. The arrangement of S+C and CO QSCs can be random or geometric (e.g., alternating rows or concentric squares). The ratio of S+C atoms to CO atoms can vary, as can the prepared quantum states.

Field generator 114 generates electric, magnetic, and electromagnetic fields for cooling, transporting, trapping, controlling the quantum states of atoms and/or other QSCs. Field generator 114 includes lasers of various frequencies and can be used to define optical lattices and optical tweezers. Field generator 114 can be used to prepare the QSCs in specific quantum states; for example, S+C atoms can be prepared in a state corresponding to a positive $\hat{x}$ pole of a Bloch sphere, while CO atoms can be prepared in states corresponding to quantum logic $|0\rangle$ and quantum logic $|1\rangle$ basis states. Alternatively, all QSCs can be prepared in the same (e.g., Bloch sphere $\hat{x}$ pole) state, and the CO QSCs can be initialized later as necessary. Field generator 114 can also transition QSCs in certain quantum states to other quantum states for measurement—e.g., so that they emit fluorescence to be captured during measurement. Measurement device 118 can be a camera that captures an image indicating which atoms in register 112 are fluorescing. Alternatively, a photodetector can be used to measure QSC locations serially and/or a spectral sensor can be used to obtain spectral information, e.g., for scenarios involving electromagnetically induced transparency (EIT). Controller 116 coordinates the actions of field generator 114 and measurement device 118 and serves as an interface to classical computer 130.

Figure 2:
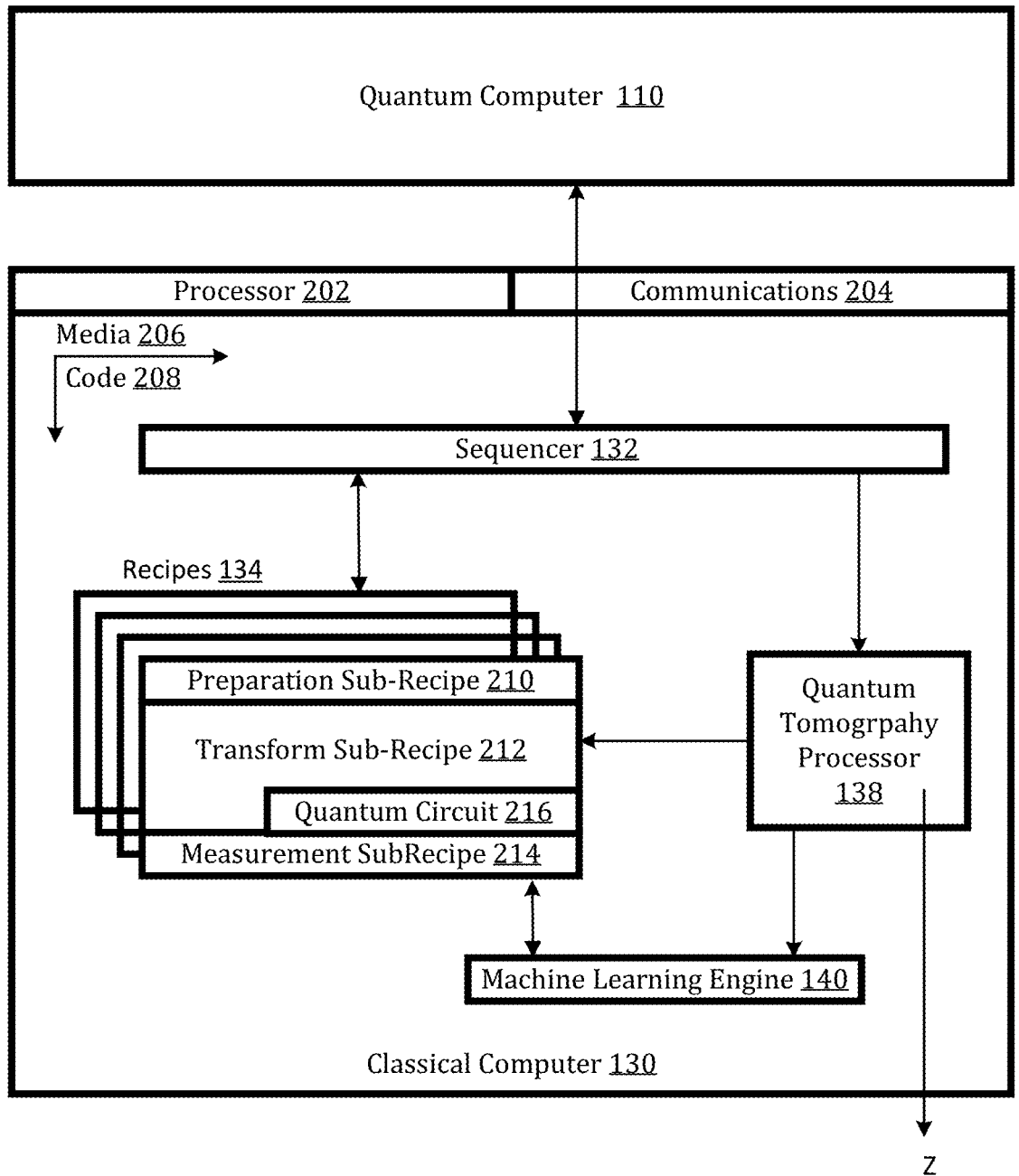
FIG. 2 is a schematic view of the hybrid computing system of FIG. 1 in which the classical computer is shown in greater detail.

As shown in FIG. 2, classical computer 130 includes hardware: a processor 202, communications devices 204, and computer-readable media 206. Media 206 is encoded with code 208 that, when executing using processor 202, defines sequencer 132, recipes 134 (FIG. 1), quantum tomography processor 138, and machine learning engine (MLE) 140. Each replica of an unknown state has a corresponding recipe, and each recipe includes a preparation sub-recipe 210, a transform sub-recipe 212, and a measurement sub-recipe 214. Each transform sub-recipe 212 includes or references a respective quantum circuit 216 of quantum circuits 136 (FIG. 1).

Sequencer 132 coordinates the activities of classical computer 130 and quantum computer 110 to implement a quantum tomography process 150 including an iterative sequence 160 and generating a model 170. Iterative sequence 160 includes: at 161, capturing sense data 161, transforming the sensor data 162 in the quantum domain, and measuring the transformed sensor data to yield measurements in the classical domain at 163. This sequence can be iterated 20-100 or more times. Generating a model 170 is based on combining the resulting measurements in the classical domain according to a selected tomography protocol.

Figure 3:
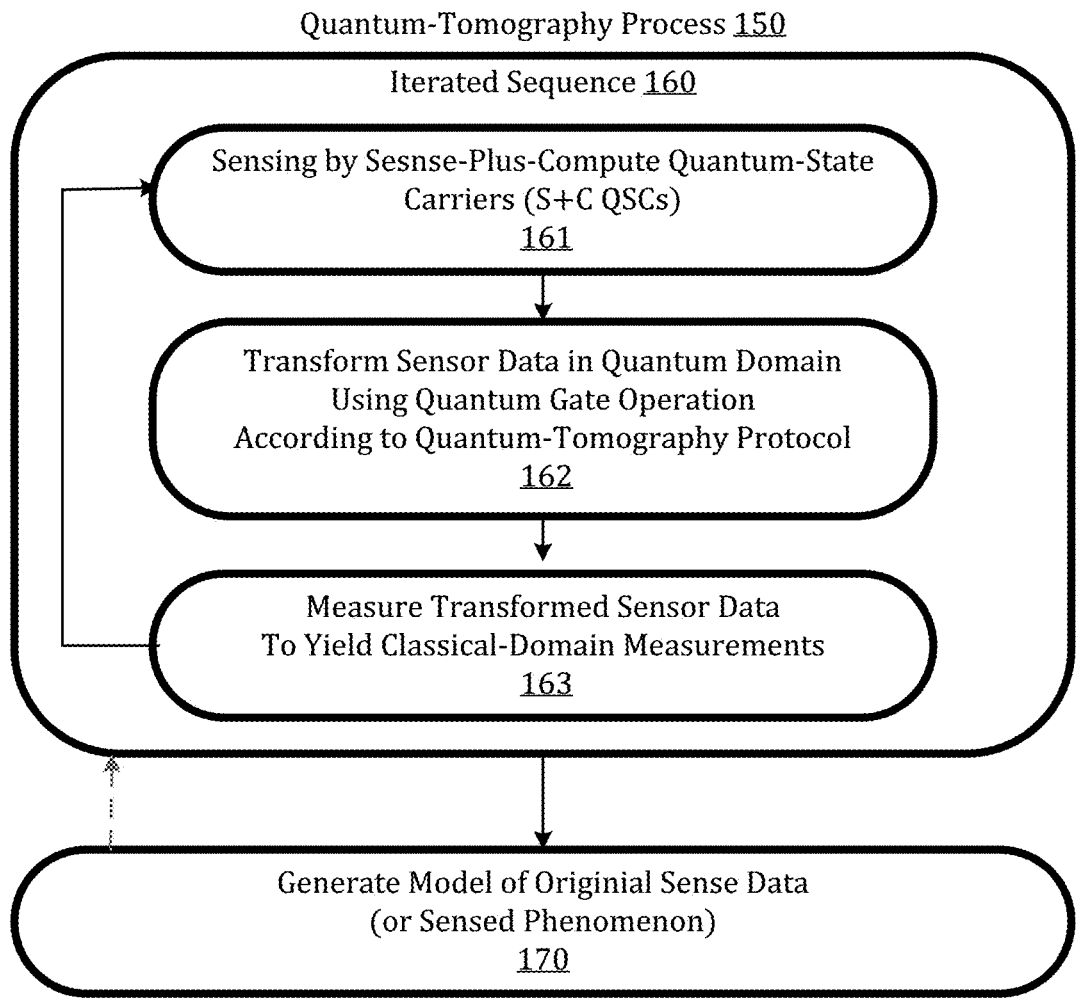
FIG. 3 is a flow chart of a quantum tomography process implementable on the hybrid computing system of FIG. 1.
Figure 4:
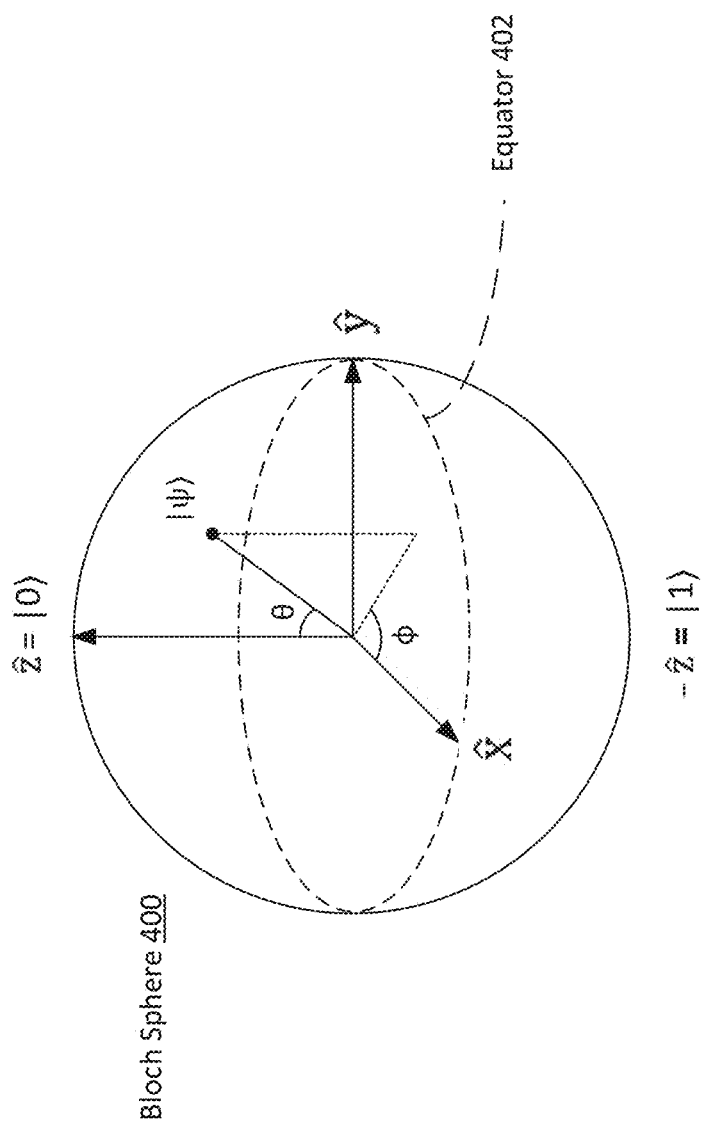
FIG. 4 is a diagram of a Bloch sphere.

Quantum tomographic process 150 is discussed in greater detail with a focus on a measurement of a time duration τ with reference to FIG. 3. Quantum states are prepared for the S+C QSCs and any CO QSCs. The specific preparation or preparations can be specified by a preparation sub-recipe 210 (FIG. 2). For example, all QSCs can be prepared in a $|0\rangle$ quantum state corresponding to a positive $\hat{z}$ (North) pole of a Bloch sphere 400 as shown in FIG. 4. The quantum-states of S+C QSCs can then be rotated to a positive $\hat{x}$ pole on the equator 402 of Bloch sphere 400, while the CO QSCs remain in the $|0\rangle$ state. In various embodiments, preparation results in different prepared states. For example, the CO QSCs can be prepared to $|1\rangle$ quantum states at the negative $-\hat{z}$ (South) pole of Bloch sphere 400. In addition, FIG. 4 shows a positive $\hat{y}$ pole, and an arbitrary quantum state $|\psi\rangle$ having a specific longitude θ relative to the $\hat{x}$ pole and a specific latitude φ relative to the $\hat{z}$ pole. Typically, preparation sub-recipe 210 (FIG. 2) does not vary from iteration to iteration other than to optimize certain parameters such as laser frequency and intensity.

In some embodiments, the prepared quantum states corresponding to quantum logic $|1\rangle$ and quantum logic $|0\rangle$ differ between the S+C QSCs and the CO QSCs. For example, quantum logic $|0\rangle$ and $|1\rangle$ can be represented by respective hyperfine ground state levels of a CO atom, while quantum logic $|0\rangle$ and $|1\rangle$ can be represented by a respective pair of Rydberg states of the S+C atoms. Of course, if the S+C QSCs and the CO QSCs are of different types, e.g., rubidium 87 and cesium 133, the quantum states representing quantum logic values can differ. In some embodiments, the quantum states representing quantum logic values differ among S+C QSCs and/or among CO QSCs. For example, the quantum states corresponding to quantum-logic values can vary among S+C rubidium atoms used to sense different radio frequencies in an RF sensor system. Preparation can include entangling the S+C QSCs, e.g., in an N-way entanglement, where N is the number of S+C QSCs.

Iterative sequence 160 begins at 161 (FIG. 3) with sensing by the S+C QSCs to yield sensor data corresponding to a wave function y for the entangled S+C QSCs. In this case, the wavefunction ψ and corresponding original sensor data are unknown and a purpose of process 150 is to estimate wavefunction ψ. In the example of measuring a time duration τ, the phase advances from the x̂ pole around the Bloch sphere equator 402, shown in FIG. 4. The unknown original sensor data corresponds to the respective positions along the equator of the quantum states of the S+C QSCs. The sensor data can be represented as N points on the surface of the Bloch sphere, where N is the number of S+C QSCs.

At 162, the original sensor data is transformed by applying quantum gate operations to the S+C QSCs. These quantum-domain gate operations can take advantage of the availability of nearby CO QSCs, as in FIG. 1. The transforms can be selected according to a quantum tomographic protocol, which requires different transforms for different iterations of sequence 160. The transforms correspond to rotations of the Bloch sphere. Since in the time duration example, all sensor data points are along the Bloch sphere equator. Since measurements do not distinguish positions along the equator, measurements of the original sensor data are not very useful. However, a transform involving a π/2 (90°) rotation about the x̂ axis converts positions along the Bloch sphere equator to positions along a great circle through the ẑ pole. Positions along that great circle can be distinguished by measurements, allowing measurement of phase data corresponding to duration. Depending on the protocol, the rotational axes can be selected systematically, randomly, and/or adaptively.

At 163, transformed sensor data is measured. For each S+C QSC, its transformed sensor data can be expressed as a qubit corresponding to a respective position on the Bloch sphere. The measurement reduces each such qubit on a probabilistic basis to a single classical bit, that is to either a classical logic 0 or a classical logic 1. Thus, measurement of the N-qubit transformed sensor data is reduced to a measurement in the form of an N-bit binary string. Each measurement results in such a N-bit string associated with the transform applied to yield the transformed data that was measured.

For example, measurement can involve irradiating the QSCs with laser light having a frequency selected to transition QSCs in a |1⟩ state (but not QSCs in a |0⟩ state) to an excited state. The excited state is chosen so that it will decay and emit fluorescence in the process. An image can be taken of the register that will show which QSCs were in the |1⟩ state and, by inference, which were in the |0⟩ state. Other embodiments use other measurement techniques to convert the transformed sense data to an N-bit string, one bit for each S+C QSC.

At 170, a model of the original sensor data and/or of the phenomenon measured is generated based on the collected measurements. The measurements are combined according to the selected quantum tomographic protocol. Assuming that approximately the same original sensor data is captured across iterations, the generated model can provide an estimate of the original sensor data. This estimate has an associated estimation error, which can be reduced by increasing the number N of S+C QSCs. If, for example, the shadow tomography protocol is selected, this reduction scales better than 1/N, even in the presence of noise. In a case where the phenomenon being sensed varies as sequence 160 is iterated, the model can provide estimates in the form of distributions and correlations.

Prior to the measurement, the quantum state of each QSC could be represented by: a probability p that upon measurement a |1⟩ would result (and by inference, a probability of 1−p that a |0⟩ would result, and a phase θ between the |1⟩ probability and the |0⟩ probability. As a result of the measurement, the phase information is lost and the probability is reduced to a single bit of classical information. If the measured state can be replicated, e.g., 100 times, repeated measurements can be made, yielding a probability distribution that can be used to estimate the pre-measurement probability p; however, the phase information cannot be recovered using repeated measurements of the same quantum state. However, by taking measurements of the same sensor data from different perspectives, both phase estimates and better probability estimates can be made. Accordingly, actions 161-163 are repeated with each iteration involving a different transformation to provide measurements taken from a variety of perspectives. The measurements can then be combined at 170 to provide an estimate of the original quantum state of the S+C QSCs.

In embodiments, random measurements are de-randomized prior to quantum-state estimation. If an estimate that is made has lower precision than desired, further iterations with additional randomly selected transformations can be made until the desired precision is attained. Furthermore, in an adaptive approach, non-random or random with constraints selections can be made as previous estimates converge on the quantum states of interest as rotation about an axis through or near a quantum state can provide the most useful data for that quantum state.

Figure 5A:
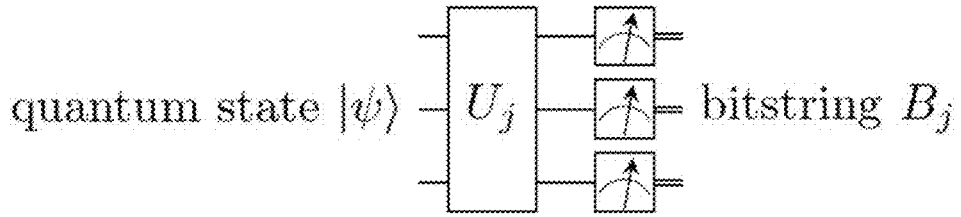
FIG. 5A is a diagram of a classical shadow being constructed using the results of unitary transformations of sensor data.

The desired Bloch sphere rotations can be implemented using unitary transformations $U_j$. Post-transform measurements yield respective N-bit bit-strings $B_k$, as represented in FIG. 5A. The quantum state estimation can take the form of a "classical shadow", which can be computed as $$C_\psi = \{(U_j B_j)\}_j$$

where j is an iteration index equal to 1 ... J, where J is the number of measurements taken.

Figure 5B:
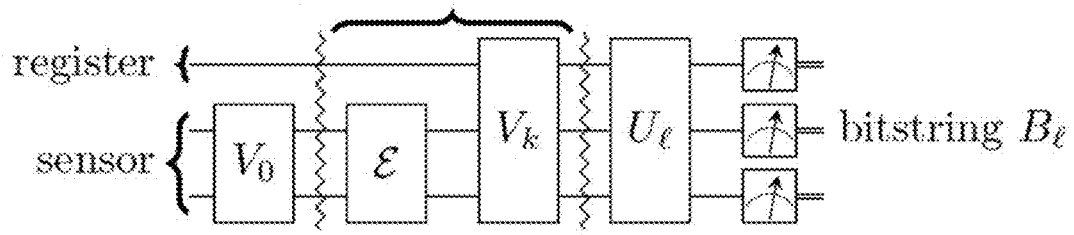
FIG. 5B is a diagram of channel estimation with quantum memory.

FIG. 5B represents a process for attaining a quantum advantage in the estimation of a quantum channel E (or properties thereof). Channel estimation is performed by repeatedly running a quantum circuit consisting of initial state preparation ($V_0$), at least one round of a channel query (E) and data processing ($V_k$), and a finally randomized measurement, which yields a classical shadow $C_E = \{(U', B')\}$. Properties of the channel E are then classically computed from the shadow $C_E$.

The present invention can achieve an exponential quantum advantage for some sensing and prediction tasks, for example, using the conception of classical shadows taught by Aaronson (ibid) and a randomized measurement toolbox as taught in A. Elben, S. T. Flammia, H.-Y. Huang, R. Kueng, J. Preskill, B. Vermersch, and P. Zoller, "The randomized measurement toolbox", (2022), arXiv:2203.11374 [quant-ph]. as well as de-randomized versions thereof as taught in R. Stricker, M. Meth, L. Postler, C. Edmunds, C. Ferrie, R. Blatt, P. Schindler, T. Monz, R. Kueng, and M. Ringbauer, "Experimental single-setting quantum state tomography", (2022)]. This invention bridges a gap between (a) theoretical breakthroughs in quantum metrology and machine learning, and (b) near-term capabilities for quantum sensing and simulation in a NISQ-era quantum computing device.

There are four key settings in which the present invention can yield an exponential quantum advantage, and thereby outperform state-of-the-art strategies for sensing and machine learning: (a) predicting observables for a target state, (b) performing principal component analysis on a target state, (c) learning properties of quantum channels, and (d) purity testing. In all four scenarios, an exponential advantage has been proven over all possible classical strategies, as long as a quantum sensor is equipped with the capability to store and process quantum data. The persistence of this advantage in the presence of noise has been, in some cases, empirically demonstrated or mathematically proven. With all essential theoretical milestones achieved, the present invention provides for applications of these achievements to concrete metrology tasks.

Embodiments use a hardware platform that simultaneously provides excellent sensing capabilities, long coherence times, and high-fidelity quantum operations for quantum data processing. Cold atoms are well suited for precision sensing, and are currently used for state-of-the-art atomic clocks, and as well as a highly controllable playing ground in which to develop and test new ideas in quantum metrology. At the same time, cold atoms are a leading platform for quantum computing and analog quantum simulation. When trapped in an optical lattice, cold atoms have demonstrated high-fidelity gates on microsecond timescales, and coherence times of around ten seconds. Moreover, virtually the same experimental configuration can be used for sensing, simulation, and computing.

Embodiments provide a quantum advantage in sensing applications including: electric or magnetic field sensing, time and frequency measurements, gravimetry, gyroscopy, and searches for new fundamental physics. Embodiments, e.g., using cold atoms, can simulate, characterize, and classify quantum (or dynamical) phases of matter for engineered Hamiltonians (or Lindbladians) of independent scientific interest. To this end, simulation targets include: disordered many-body systems, driven-dissipative dynamics, superconductivity, quantum chaos, and topological order.

In embodiments, sensing QSC and compute QSCs are encoded in the same atomic states, and, in some cases, using the same atomic species and/or isotopes. In some embodiments, the sensing and compute QSCs are separated, in other embodiments they are arranged in the same quantum register. Embodiments provide protocols that are self-contained and comprehensive, spanning system initialization, sensing (e.g., simulation), quantum data processing, and measurement. To ensure a thorough account of experimental considerations, the protocols can be supplemented by preliminary demonstrations of application subroutines on a cold atom computing device. Success for this objective can entail one protocol per application.

Given the unique manner in which quantum sensing, simulation, and computing capabilities come together with cold atoms, some applications are naturally well-suited to cold atoms, and thereby less relevant for other experimental platforms. While the focus herein is on cold-atom implementations, embodiments can employ other quantum technologies, notably trapped ions for which many of the features of a cold atom system carry over due to a similar convergence of quantum sensing, simulation, and computation capabilities. Applications that can, in principle, be cast into a format that leverages classical shadows to achieve a practical quantum advantage can be platform-agnostic. The circuit-level requirements to achieve a quantum advantage for a given application are likewise independent of any underlying hardware. Despite the focus on cold atom platforms, most of teachings herein readily translate to other platforms.

Traditional metrological schemes typically aim to estimate a small number of specific expectation values, such as the average projection of quantum spin onto a few quantization axes. Progress in these fields has therefore been driven by the design of improved techniques to estimate the same handful of expectation values. In contrast, the present invention provides for estimating a large number of expectation values from a quantum state's classical shadow or other classical representation. The first step towards leveraging classical shadows for metrology is therefore to recast traditional metrological tasks into a format that is compatible with the formalism of classical shadows. That is: for a given metrological task (of independent interest), existing protocols are modified in such a way as to extract their target signal from the classical shadow of a quantum state.

As a concrete example, consider the task of estimating an unknown time interval $\tau$ with an atomic clock. On a high level, the state-of-the-art strategy for this task, known as Ramsey spectroscopy, essentially boils down to the following protocol:

1. Initialize an array of qubits with a known energy difference $\omega$ between their computational $|0\rangle$ and $|1\rangle$ states, and prepare all qubits in the uniform superposition $|0\rangle + |1\rangle$.
2. Let the qubits evolve freely for the time interval $\tau$ to be estimated, such that every qubit is in the rotated state $|0\rangle + e^{-i\omega\tau}|1\rangle$.
3. Measure every qubit in the Pauli-X basis, and estimate $\tau$ from the fact that $$\cos(\omega\tau) = \langle \bar{X} \rangle, \text{ where } \bar{X} = \frac{1}{N}\sum_{j=1}^{N} X_j$$

is the average over all Pauli-X operators on individual qubits. In a precision metrology setting, the range of $\tau$ is typically known a priori to within $\sim 1/\omega$, alleviating ambiguities from the periodicity of $\cos(\omega\tau)$.

When carried out with N qubits, this Ramsey spectroscopy protocol provides an estimate of $\tau$ to within an uncertainty of $\delta_{\tau SQL} \sim 1/N$, known as the standard quantum limit (SQL). SQL is a consequence of shot noise: measuring qubit j in the Pauli-X basis can only yield an outcome of $\pm 1$. If $\langle X \rangle = 0$, for example, this vanishing expectation value must be inferred by averaging out uncorrelated measurement outcomes of $+1$ or $-1$ on individual qubits. Beating the SQL of $\Omega(1/N)$ scaling for the uncertainty in $\tau$ requires entangling the qubits at the beginning of the clock protocol.

To this end, one of the leading strategies for beating the SQL is to prepare so-called spin-squeezed states in which measurement outcomes for individual spins can be correlated in such a way as to reduce the final uncertainty in $\langle X \rangle$. The canonical model for spin squeezing is the one-axis twisting (OAT) Hamiltonian $$H_{OAT} = \frac{1}{4}\chi \sum_{j,k} Z_j Z_k.$$

Evolving the initial state $|\psi_x\rangle = (|0\rangle + |1\rangle)^{\otimes N}$ under $H_{OAT}$ for a time t generates squeezed states with reduced uncertainties in some spin-averaged Pauli observables (i.e., linear combinations of X, Y and Z) when $t < t_{OAT}^*$, but subsequently "over-squeezes" when $t > t_{OAT}^*$ and increases the uncertainties for all such observables. The conventional wisdom is therefore to squeeze for a time $t = t_{OAT}^*$.

Figure 6A:
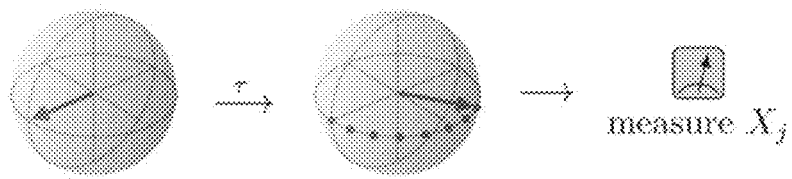
FIG. 6A is a diagram of a measurement of sensor data for a single quantum-state carrier.
Figure 6B:
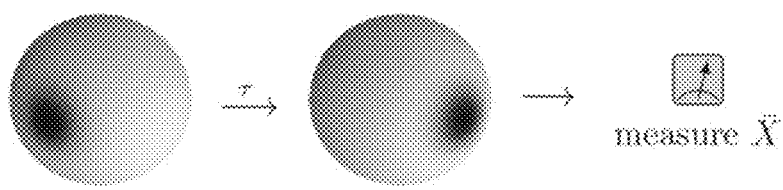
FIG. 6B is a diagram of a measurement of sensor data for a number N of quantum state carriers.

A Bloch sphere representation, shown in FIG. 6A, of a single qubit j being used to estimate an unknown time interval $\tau$ via Ramsey spectroscopy. The expectation value for the Pauli-X operator $X_j$ at the end is $\langle X \rangle = \cos(\omega\tau)$, but the uncertainty $\sigma(X_j)$ in an estimate of this expectation value is large because the only possible single-shot measurement outcomes are ±1. If, as shown in FIG. 6B, the same procedure is performed with N qubits in parallel, the state $|\psi\rangle$ of all N qubits can be represented by a distribution on the unit sphere, for which a higher value (darker color) at a point v on the sphere corresponds to a larger overlap $|\langle \psi | v \rangle|^2$ of the true state $|\psi\rangle$ with a state $|v\rangle$ in which all spins point to v. The width of this distribution thereby characterizes the degree to which it is possible to precisely locate the orientation of these spins along a given axis in a single measurement. If all spins point in the same direction, this width is $\sim 1/\sqrt{N}$, which translates to an uncertainty $\sigma(X) \sim 1/\sqrt{N}$ in a single-shot estimate of X.

Figure 6C:
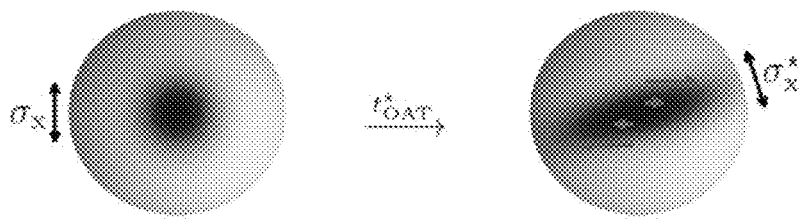
FIG. 6C is a diagram showing the effect of squeezing a distribution of sensor data for quantum state carriers.
Figure 6D:
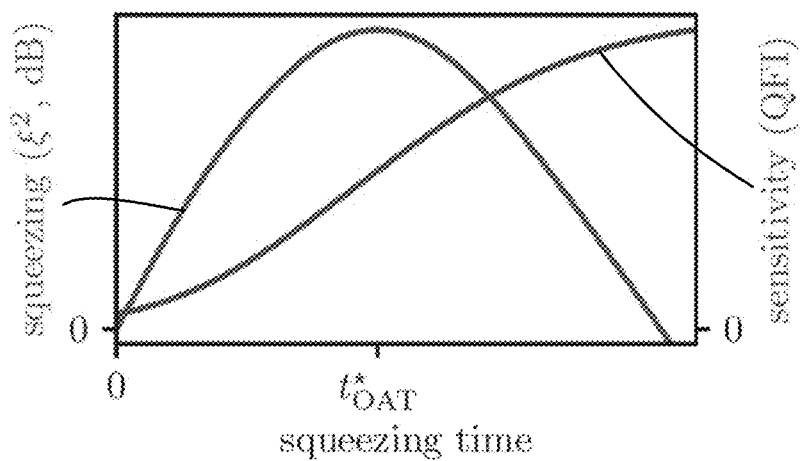
FIG. 6D is a graph comparing the correlations of squeezing and sensitivity as a function of time.

Theoretically, however, the sensitivity (quantified by the quantum Fisher information) of the state $e^{-itH_{OAT}}|\psi_x\rangle$ to homogeneous spin rotations (such as the rotation in step 2 of the standard clock protocol) continues to increase with times t past $t_{OAT}^*$. As represented in FIG. 6C, the one-axis twisting (OAT) Hamiltonian is so called because it twists the distribution of a state on the sphere, thereby converting an initial state with width $\sigma_X \sim 1/\sqrt{N}$ into a squeezed state with minimal width of $\sigma_X^* \sim 1/N^{2/3} < 1/\sqrt{N}$ at time $t = t_{OAT}^*$. Squeezing allows for more precise estimates of a rotation angle along the minimum-width axis. As indicated in FIG. 6D, the metrological utility of a squeezed state for Ramsey spectroscopy can be quantified by the Ramsey squeezing parameter $\xi^2$, which for the OAT model hits a maximum at time $t = t_{OAT}^*$ before falling back down. However, the theoretical sensitivity of a state to the signal $\tau$ is quantified by the quantum Fisher information, which continues to increase past $t = t_{OAT}^*$.

The problem for spin squeezing is that after $t = t_{OAT}^*$, sensitivity to the signal $\tau$ becomes buried in "off-target" observables. Specifically, the standard clock protocol (as described above) only collects information about the observable X and powers thereof. This protocol is therefore insensitive to signatures of the signal $\tau$ that are imprinted onto other observables. A protocol that collects and incorporates information about more observables should recover the sensitivity of over-squeezed states to the signal.

A multi-classical-perspective approach, such as classical shadows, can predict a large number of observables, and thus can recover the theoretical metrological utility of over-squeezed states. Furthermore, other, nonsqueezing Hamiltonians can be used to prepare states whose classical shadows are highly sensitive to spin rotations (or other signals of external interest).

The present invention also provides a quantum advantage for a quantum principal component analysis (i.e., predicting properties of the dominant principal component $|\psi\rangle$) in a mixed state $\rho$ with the spectral decomposition $\Sigma_j p_j |\psi_j\rangle\langle\psi_j|$ reveal information about a signal $\tau$ that would otherwise be lost to noise, thereby extending the "useful" coherence time of a quantum sensor.

Similar approaches can be used to leverage classical shadows in quantum simulation tasks. Phases of matter are often characterized with a small number of order parameters. Classical shadows can be used to enhance these efforts, either by reducing the cost (e.g., the number of experimental trials) necessary to diagnose distinct phases, and/or by revealing entirely new phases to which traditional order parameters are not sensitive. This approach has been substantiated by passing measurement data from a quantum processor to a classical unsupervised machine learning model. The task of the machine learning model was to identify the symmetry class of a Hamiltonian simulated on the quantum processor (specifically, whether the Hamiltonian was time-reversal symmetric). Strikingly, for a fixed number of trials, the use of classical shadows led to a clean separation of Hamiltonians by their symmetry class, whereas a deterministic measurement strategy designed for this task failed to classify Hamiltonians altogether.

The symmetry classification demonstration showcases Theorem 3 therein, which asserts a quantum advantage in learning quantum channels. Other pathways to a quantum advantage can be leveraged for quantum simulation. The quantum principal component analysis, for example, can be used to diagnose driven-dissipative phase transitions when the principal component of a steady state changes across a phase boundary.

Classification can be performed without passing measurement data through a machine-learning model. The use of a black-box classifier obfuscates physical insights that have a broader scientific value. Due to the nature of the data representing classical shadows (i.e. a measurement outcome for each of many randomized measurement bases), a "big data" approach can use classical shadows for classifying phases of matter.

In an error-correcting code (whether classical or quantum), many noisy "physical" bits are used to encode fewer error-corrected "logical" bits. If the error rate for physical bits is too large, however, the added computational overhead of error correction induces more errors than it corrects. The (pseudo-)threshold of an error-correcting code is the "breakeven" point at which logical and physical error rates are equal; subsequent reductions to the physical error rate lead to dramatic improvements to the logical error rate.

Similarly, scaling analyses can identify performance metrics (such as experimental trials or coherence times) by which classical multi-perspective quantum-state estimation outperforms the state-of-the-art methods for a given application. Thus, the breakeven point can be found by classically simulating systems with different sizes and noise levels and investigating the dependence of performance on these parameters. It is worth noting that recent works make the remarkable prediction that a quantum advantage is apparent in some (possibly synthetic) applications with as few as 10 qubits, demonstrating that the breakeven point for QUCAM is within reach of classical simulations. However, in scenarios in which reaching breakeven requires more qubits than are classically simulable, extrapolating QUCAM performance to larger system sizes yields concrete predictions.

Exact simulations of noiseless systems can be performed by numerically integrating the Schrödinger equation and can determine the bare minimum qubit numbers required to reach breakeven. Generally speaking, these simulations can be used to investigate systems with moderate qubit numbers (~20-30) regardless of the application. Moreover, some applications have symmetries that enable simulations of larger qubit numbers, thereby increasing their potential to locate a breakeven point without extrapolation. In the case of the spin squeezing, for example, the dimension of accessible Hilbert space (in the absence of noise) grows linearly with system size, allowing for exact simulations of ~$10^5$ qubits.

If noise is sufficiently weak, it is most efficiently accounted for with the so-called quantum jump method, also known as the Monte Carlo wavefunction method. The quantum jump method accounts for incoherent, Markovian noise (such as spin decay or dephasing) by (a) numerically integrating the Schrödinger equation with an effective non-Hermitian Hamiltonian (whose precise form is derived from a noise model), and (b) stochastically applying jump operators that represent the loss of information from a system to its environment. Coherent, non-Markovian errors, such as pulse time variations, can be accounted for by random shifts to control or interaction parameters. Averaging over the results of many such simulations with different random number seeds recovers exact expectation values for a noisy system. As these simulations are based on time-evolving a pure state, they can access roughly the same qubit numbers as exact simulations of a noiseless system (~15-25 qubits, depending on the level of noise).

As noise gets stronger, the quantum jump method needs to average over more simulations to converge to accurate expectation values. If noise is too strong, it becomes more efficient to time-evolve a density matrix by numerically integrating Lindbladian equations of motion. These simulations account for incoherent errors exactly (i.e., without averaging), but can still require stochastic averaging to account for coherent errors. Since these simulations time-evolve a density matrix, rather than a state vector, accessible qubit numbers are more limited (~10-15). However, application-specific simulation techniques can still enable simulating larger systems. The density matrix of N qubits with permutational symmetry (as in the case of spin squeezing, for example, has only $O(N^3)$ degrees of freedom, allowing for exact simulations of ~50 noisy qubits (and even hundreds at short evolution times).

Reaching breakeven is distinct from pushing the state-of-the-art. The breakeven point for an application is merely the point at which QUCAM's quantum computing overhead no longer negates the benefits of using classical shadows and related techniques. Scaling up to larger systems or lower error rates subsequently leads to major gains in performance, as favorable asymptotic scaling relations begin to kick in. However, QUCAM pushes the state-of-the-art, which additionally involves predicting expected QUCAM performance at larger system sizes and lower noise levels and comparing this performance to the best known methods for a given application. For example, the most precise atomic clocks can currently measure frequencies with a relative prevision below $10^{-20}$. A natural question for QUCAM is therefore: how many qubits, how many gates, and what noise levels are necessary for QUCAM to push the state-of-the-art in frequency measurement for a given application? Answering such a question requires combining the numerical results for breakeven requirements with scaling relations.

The requirements to reach breakeven are approximately independent of architecture, i.e., it is unlikely that different architectures will have breakeven requirements that differ by orders of magnitude. QUCAM requires both sensing and computing capabilities, but it is not clear a priori how (or even whether) to separate sensing and compute qubits in a cold atom platform. The answer to this question is application-specific; approaches include (a) selectively shelving qubits into atomic states that are off-target during sensing or compute modes of operation, or (b) preparing multi-species cold atom qubit registers, and using each atomic species for a different purpose (e.g., quantum sensing, memory, or data processing).

As an example of the first strategy, (a), consider the case of magnetic field sensing with a single-species array of ultracold cesium atoms. Computational and memory qubits can be encoded in the |f, m=0⟩ clock states, in which the combined spin of the valence electron and atomic nucleus have net spin f and spin projection m=0 onto a spin quantization axis: |0⟩ =|3, 0⟩ and |1⟩ =|4, 0⟩. These states are robust to magnetic field perturbations since they have a non-linear magnetic field (Zeeman) shift, and only a weak quadratic sensitivity to magnetic fields. The computational |1⟩ state can be selectively transferred to the atomic |10=|3, 1⟩ state on an atom-by-atom basis using a combination of microwave and optical control fields. This defines a set of sensing qubits that are encoded in the |0⟩, |10⟩ states, and which have a differential magnetic field (Zeeman) splitting of 0.35 MHz/G. A weak external magnetic field will therefore impart an Rz gate on the sensing qubits, while only minimally perturbing the computational qubits. Sensing qubits can subsequently be transferred back into the |0⟩, |1⟩ basis for quantum processing and measurement. Sensing for |1⟩ ↔|1'⟩ re-encoding on the fly can be simulated by applying Rz gates on |0⟩, |1⟩ qubits in a demonstration of post-acquisition signal processing in a cold atom quantum computer.

Embodiments differ in how sensing and compute qubits are arranged in the atomic array. In some embodiments, the quantum register is split into contiguous sensing and computing sectors, which has the advantage of maximizing qubit connectivity within each sector but can introduce considerable computational overhead for inter-sector communication. A checkerboard (see FIG. 1) or striped arrangement of sensing and compute qubits can therefore be more suitable for applications that can sacrifice intra-sector communication for improved inter-sector connectivity (e.g., for ancilla memory qubits). Generally speaking, the best qubit arrangement can depend on the data processing and communication needs of a given QUCAM application. Moreover, the invention provides alternative embodiments: 1) in which the S+C QSCs are in the quantum register while sensing; and 2) the S+C QSCs are transported into or within the register after sensing.

The invention applies to sensor data that varies from iteration to iteration. In such cases, quantum tomography can identify distributions, correlations, and functions of time, e.g., that characterize a phenomenon. In some cases, predictions can be made from estimated trends. Such predictions can be further refined by imposing constraints, e.g., due to the laws of physics. For example, predictions can be enhanced by applying Kalman filtering, also known as "linear quadratic estimation" (LQE), which is an algorithm that uses a series of measurements observed over time, including statistical noise and other inaccuracies, and produces estimates of unknown variables that tend to be more accurate than those based on a single measurement alone, by estimating a joint probability distribution over the variables for each timeframe.

Herein, a "compute QSC" is a QSC that can transition between quantum states in response to gate-mode quantum computer operations such as initialization to a known state, quantum logic gate operations, and operations relating to measurement of a result of quantum-logic operations. A "sense QSC" is either: 1) a QSC that, in the context of a given system, can transition from a first (typically known) quantum state to a second (typically unknown) quantum state in response to an interaction with a field, a gradient, the passage of time, or other physical phenomenon other than operations associated with gate-mode quantum computing operations; or 2) part of an entangled system of QSCs, the collective quantum state of which is to be determined according to a quantum tomography protocol. A QSC that qualifies as a sense QSC and as a compute QSC, in a given context, is referred to herein as a "sense-plus-compute QSC" or "S+C QSC". For example, a rubidium 87 ($^{87}$Rb) atom can serve both as a sensor and an element of a quantum logic gate. A QSC that qualifies as a compute QSC but not as sense QSC is referred to herein as a "compute-only QSC" or "CO QSC". A QSC that qualifies as a sense QSC but not as a compute QSC is referred to herein as a "sense-only QSC" or "SO QSC".

In embodiments, S+C QSCs and CO QSCs are both included in a quantum register during transformation of original sensor data to transformed sensor data. In some embodiments, the S+C QSCs are in the register during sensing and measurement. In other embodiments, the S+C QSCs are elsewhere during sensing and are transported to the register or the register is formed once sensing is complete; and in some embodiments, either the S+C QSCs or the CO QSCs are removed from the register prior to measurement.

A quantum system can comprise one or more units referred to herein as "quantum state carriers" (QSCs). Herein, a "quantum state carrier" (QSC) is any physical system that can assume alternative eigenstates and superpositions of those eigenstates. Classes of QSCs include superconducting circuits, quantum dots in semiconductor hosts, color centers in a solid-state host (e.g., nitrogen-vacuum centers in diamond, and neutral and charged atoms and molecules. Each of these QSC classes has its own advantages for respective practical applications. QSCs can become entangled in that the quantum state of one QSC can depend on (is correlated with) the quantum state of another QSC. Much of the power of quantum technology is derived from the ability of QSCs to assume superposition states and to become entangled with other QSCs.

Two QSCs are the "same type" if they are nominally identical, even though they are in different temporary quantum states. For example, two rubidium 87 atoms are QSCs of the same type even though one is in a ground state and the other is in a Rydberg or other excited state. However, a neutral rubidium 87 atom is a different QSC type than any of a rubidium 85 atom, a rubidium ion, an atom of any element other than rubidium, a molecular entity other than an atom, a superconducting circuit, etc. Herein, a "molecular entity" is any particle that cannot be divided without losing its chemical properties. Examples of molecular entities, include neutral and charged atoms and molecules and other entities listed in the *IUPAC Gold Book* under "molecular entity".

The quantum tomography protocols described herein are "multi-perspective". Herein, "multi-perspective" refers to a representation that is constructed based on measurements taken from multiple (≥3) perspectives, e.g., of a Bloch sphere. In the context of the present invention, the measurements are of the quantum states of S+C QSCs. The present invention provides for QSCs that are included in a quantum register that can also serve as sensors.

The quantum computers of interest herein execute quantum circuits along with their constituent quantum gates and measure the quantum circuit results. Typically, additional operations are implemented to prepare QSCs for quantum circuit execution and measurement. In the course of these quantum computer operations, QSCs respond to fields and potentials, e.g., fields generated by lasers and other electromagnetic radiation (EMR) sources, interactions with nearby QSCs, and potentials associated fluorescence and other decay events. S+C QSCs typically respond to fields and gradients other than those associated with quantum computing. In addition, the quantum states of primary interest are those that exist prior to their conversion in the course of quantum circuit execution and the quantum circuits are designed to estimate these quantum states of primary interest. According, a QSC is an S+C QSC if, in the context of an incorporating system or process, the QSC transitions to a quantum state in response to a field or gradient other than those associated with quantum computing or, it responds to fields or gradient associated with quantum computing by transitioning to a quantum state, but the resulting quantum state is to be estimated using quantum circuits applied to the quantum state. (The latter condition is directly mainly to S+C QSCs used to monitor conditions in the interior of the quantum computer.)

Herein, "scales more like 1/N than like 1/N" means "scales faster than $$1/N^{\frac{3}{4}''}.$$

In present context, unis means that, with increasing number N of S+C QSCs, the estimate error decreases faster than $$1/N^{\frac{3}{4}} = N^{-3/4}.$$

Likewise, model precision increases faster than $N^{3/4}$ when it increases closer to N than N. In this context, "scales faster than 1/N" means reduces faster than 1/N as N increases.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' can refer to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

Herein, all art labeled "prior art", if any, is admitted prior art; all art not labeled "prior art", if any, is not admitted prior art. The disclosed embodiments, variations thereupon and modifications thereto are within the scope of the present invention as defined by the following claims.

What is claimed is:

1. A process comprising:
repeatedly performing a sequence of actions to yield a set of classical domain measurements, the sequence of actions including:
entangling sense-plus-compute (S+C) quantum-state carriers (QSCs), wherein the entangling results in at least two groups of entangled QSCs and different groups of the QSCs that are not entangled with each other;
a capturing instance of capturing original sensor data using the at least two groups of entangled QSCs, wherein the original sensor data is represented by quantum states of the at least two groups of entangled S+C QSCs, the capturing instance using a set of at least three S+C QSCs;
an applying instance of applying quantum gate operations to the S+C QSCs, the applying instance implementing a quantum-domain transformation of the original sensor data to yield transformed sensor data;
measuring the transformed sensor data to yield one of the set of classical domain measurements; and
generating a model of the original sensor data based on the set of classical domain measurements.

2. The process of claim 1 wherein each of the S+C QSCs that capture the original sensor data during a same repetition of the sequence of actions is entangled with a plurality of other QSCs that capture additional original sensor data during the same repetition of the sequence of actions.

3. The process of claim 1 wherein the model has an associated estimation error that decreases faster than $1/\sqrt{N}$ as a number N of entangled S+C QSCs increases.

4. The process of claim 1 wherein different quantum-domain transforms are implemented during different repetitions of the sequence of actions, the quantum-domain transforms being selected according to a quantum tomography protocol.

5. The process of claim 4 wherein the quantum tomography protocol is a shadow tomography protocol.

6. The process of claim 1 wherein the S+C QSCs are molecular entities.

7. The process of claim 6 wherein the molecular entities are neutral alkali or alkaline-earth metal atoms.

8. The process of claim 1 wherein the transformed sensor data characterizes a result of a quantum simulation.

9. A hybrid system comprising:
a sensor system that enables a set of at least three sense-plus-compute (S+C) quantum-state carriers (QSCs) to capture original sensor data and represent the original sensor data by quantum states of the S+C QSCs;
a quantum computer configured to apply quantum-gate operations to the S+C QSCs; and
a classical computer configured to combine multiple classical-domain measurements of transformed sensor data to yield a model of the original sensor data or of a phenomenon represented by the original sensor data, wherein, the quantum-gate operations transform the original sensor data to yield the transformed sensor data, the quantum computer including a measurement subsystem configured to measure the transformed sensor data to yield the multiple classical-domain measurements,
wherein each of the S+C QSCs is entangled with at least one other but not all others of the S+C QSCs.

10. The hybrid system of claim 9 wherein each of the S+C QSCs is entangled with all others of the S+C QSCs.

11. The hybrid system of claim 9 wherein the model has an associated estimation error that decreases faster than $1/\sqrt{N}$ as a number N of entangled S+C QSCs increases.

12. The hybrid system of claim 9 wherein the quantum computer applies quantum gate operations to implement transforms selected according to a quantum tomography protocol.

13. The hybrid system of claim 12 wherein the quantum tomography protocol is a shadow tomography protocol.

14. The hybrid system of claim 9 wherein the S+C QSCs are molecular entities.

15. The hybrid system of claim 14 wherein the molecular entities are neutral alkali or alkaline-earth metal atoms.

16. The hybrid system of claim 9 wherein the S+C QSCs that capture the original sensor data are included in a quantum register that also includes compute-only (CO) QSCs that do not capture sensor data.

17. The hybrid system of claim 16 wherein the S+C QSCs and the CO QSCs are of a same QSC type.

18. The hybrid system of claim 16 wherein the S+C QSCs are of a first QSC type and the CO QSCs are of a second QSC type, the second QSC type being different from the first QSC type.

19. The hybrid system of claim 18 wherein the first QSC type and the second QSC type are selected from a set consisting of types of rubidium atoms and cesium atoms.

20. The hybrid system of claim 9 wherein the original sensor data characterizes a result of a quantum simulation.

21. A process comprising:
repeatedly performing a sequence of actions to yield a set of classical domain measurements, the sequence of actions including:
a capturing instance of capturing original sensor data using sense-plus-compute (S+C) quantum-state carriers (QSCs), wherein the original sensor data is represented by quantum states of the S+C QSCs;
an applying instance of applying quantum gate operations to the S+C QSCs and to compute-only (CO) QSCs that are not used to capture sensor data, the applying instance implementing a quantum-domain transformation of the original sensor data to yield transformed sensor data, wherein the S+C QSCs are of a first QSC type and the CO QSCs are of a second QSC type, the second QSC type being different from the first QSC type, and wherein the first QSC type and the second QSC type are selected from a set consisting of types of rubidium atoms and cesium atoms;

measuring the transformed sensor data to yield one of the set of classical domain measurements; and generating a model of the original sensor data based on the set of classical domain measurements.

22. The process of claim 21 wherein the sequence of actions includes entangling the S+C QSCs.

23. The process of claim 22 wherein each of the S+C QSCs that capture the original sensor data during a same repetition of the sequence of actions is entangled with a plurality of other QSCs that capture additional original sensor data during the same repetition of the sequence of actions.

24. The process of claim 22 wherein entangling the S+C QSCs results in at least two groups of entangled QSCs that capture original data during a same repetition of the sequence of actions wherein QSCs of different groups are not entangled with each other.

25. The process of claim 22 wherein the model has an associated estimation error that decreases faster than $1/\sqrt{N}$ as a number N of entangled S+C QSCs increases.

26. The process of claim 21 wherein different quantum-domain transforms are implemented during different repetitions of the sequence of actions, the quantum-domain transforms being selected according to a quantum tomography protocol.

27. The process of claim 26 wherein the quantum tomography protocol is a shadow tomography protocol.

* * * * *